United States Patent [19]

Drewes et al.

[11] Patent Number: 5,543,449
[45] Date of Patent: Aug. 6, 1996

[54] STABILIZED FLEXIBLE PVC

[75] Inventors: Rolf Drewes, Lindenfels; Markus Kolb, Plankstadt; Karl J. Kuhn, Lautertal; Hans-Jürgen Sander, Lorsch; Wolfgang Wehner, Ober-Ramstadt, all of Germany

[73] Assignee: Ciba-Geigy Corporation, Tarrytown, N.Y.

[21] Appl. No.: 419,310

[22] Filed: Apr. 10, 1995

[30] Foreign Application Priority Data

Apr. 15, 1994 [CH] Switzerland ............... 1140/94

[51] Int. Cl.$^6$ ............... C08K 5/15; C08K 3/16; C08L 63/02; C08L 63/06
[52] U.S. Cl. ............ 524/114; 523/400; 524/401; 524/438; 525/121; 521/90; 521/145; 264/331.15
[58] Field of Search .................. 524/114, 401, 524/438; 523/400; 525/121; 521/90, 145; 264/331.15

[56] References Cited

U.S. PATENT DOCUMENTS

| | | | |
|---|---|---|---|
| 3,928,267 | 12/1975 | Rhodes et al. | |
| 4,675,356 | 6/1987 | Miyata | 524/399 |
| 4,861,816 | 8/1989 | Kobayashi et al. | 524/401 |
| 4,957,954 | 9/1990 | Iizuka et al. | 524/428 |
| 5,004,776 | 4/1991 | Tadenuma et al. | 524/399 |
| 5,147,917 | 9/1992 | Sugawara et al. | 524/425 |
| 5,492,949 | 2/1996 | Drewes et al. | 524/114 |

FOREIGN PATENT DOCUMENTS

| | | |
|---|---|---|
| 0522810 | 1/1993 | European Pat. Off. . |
| 0625546 | 3/1995 | European Pat. Off. . |
| 3402408 | 7/1985 | Germany . |
| 3122149 | 5/1991 | Japan . |

OTHER PUBLICATIONS

Derwent Abstract 93–374696 of JP 5,279,533.
Patent Abstracts of Japan, vol. 13, No. 595(C–672) (1989) of JP 1,252,649.
Patent Abstracts of Japan, vol. 16, No. 406(C–0978) (1992) of JP 4,136,054.

*Primary Examiner*—Peter A. Szekely
*Attorney, Agent, or Firm*—Michele A. Kovaleski

[57] ABSTRACT

A high degree of stabilization of flexible PVC is achieved by using a perchlorate and a terminal epoxide compound.

16 Claims, No Drawings

STABILIZED FLEXIBLE PVC

The invention relates to a flexible PVC (polyvinyl chloride) which has been stabilized by epoxide compounds and perchlorates, to a process for its preparation, and to its use.

PVC can be stabilized by a number of additives. Heavy-metal compounds of lead and cadmium are particularly suitable for this purpose, but are controversial today for ecological reasons due to the heavy-metal content (cf. "Plastics Additives", Editors R. Gächter and H. Mäiller, Hanser Verlag, Munich, Vienna, New York, 3rd Edition, 1990, pages 287–295, and "Kunststoff-Handbuch PVC" [Plastics Handbook PVC], Volumes 1 and 2, Beck/Braun, Carl Hanser Verlag, Munich).

The search therefore continues for effective stabilizers and stabilizer combinations.

Epoxide compounds have been known for some time as costabilizers for PVC. Epoxidized soybean oil is frequently used (cf., for example, "Plastics Additives", Editors R. Gächter and H. Müller, Hanser Verlag, 3rd Edition, 1990, pages 303–4, and U.S. Pat. No. 3 928 267). For chlorinated polyvinyl chloride, the use of glycidyl ethers of novolak resins as stabilizer has also been described, for example in DE 3 402 408.

JP Hei 3122149 proposes a rigid PVC composition comprising solid epoxides and perchlorates.

It has now been found that flexible PVC stabilized by means of a mixture of a perchlorate and a terminal epoxide has excellent thermal stability with a good initial colour and good colour retention. Surprisingly, the flexible PVC stabilized in accordance with the invention meets the high demands made, for example, of PVC stabilized by means of barium/zinc compounds. Particular mention should be made of the excellent shelf life and light stability that are achieved. Furthermore, good stabilization is achieved irrespective of the state of aggregation of the epoxide, i.e. liquid terminal epoxides can also be employed without disadvantage.

The invention therefore relates to a composition comprising (a) flexible PVC, (b) perchloric acid or a perchlorate and (c) a terminal epoxide compound.

The composition preferably contains no compounds of lead or cadmium.

For the purposes of the present invention, flexible PVC denotes PVC mixtures comprising a proportion of at least one plasticizer sufficient to achieve the properties of flexible PVC.

PVC having a glass transition temperature of above 70° C. is not regarded as flexible PVC for the purposes of this invention.

Flexible PVC is furthermore defined by its suitability, owing to its plasticizer content, for the production of flexible PVC articles. These include, for example, cable and wire sheaths, roof membranes, decoration sheeting, foams, agricultural sheeting, office films, automotive sheeting (also polyurethane foam-backed), tubes, sealing profiles and the like.

Component (a) in the novel compositions can also be blends, copolymers or graft polymers of PVC with polymefizable compounds, such as acrylonitrile, vinyl acetate or (co)polymers such as ABS, where suspension, bulk or emulsion polymers and mixtures thereof are possible. Examples of such components (a) are compositions comprising (i) 20–80 parts by weight of a vinyl chloride homopolymer (PVC) and (ii) 80–20 parts by weight of at least one thermoplastic copolymer based on styrene and acrylonitrile, in particular from the group consisting of ABS, NBR, NAR, SAN and EVA. The abbreviations used for the copolymers are known to the person skilled in the art and have the following meanings: ABS =acrylonitrile-butadiene-styrene; SAN =styrene-acrylonitrile; NBR =acrylonitfile-butadiene; NAR =acrylonitrile-acrylate; EVA =ethylene-vinyl acetate. Also suitable are, in particular, acrylate-based styrene-acrylonitrile copolymers (ASA). In this connection, component (a) is preferably a polymer composition comprising, as components (i) and (ii), a mixture of 25–75% by weight of PVC and 75–25% by weight of said copolymers. Examples of such compositions are: 25–50% by weight of PVC and 75–50% by weight of copolymers or 40–75% by weight of PVC and 60–25% by weight of copolymers. Preferred copolymers are ABS, SAN and modified EVA, in particular ABS. NBR, NAR and EVA are also particularly suitable. The novel composition can comprise one or more of said copolymers. Of particular importance as component (a) are compositions comprising (i) 100 parts by weight of PVC and (ii) 0–300 parts by weight of ABS and/or SAN-modified ABS and 0–80 parts by weight of the copolymers NBR, NAR and/or EVA, but in particular EVA, and, per 100 parts by weight of (i) and (ii), 5–120 parts by weight of plasticizers, in particular phthalates, especially DOP, DINP and DIDP, and/or trimellitates, especially TOTM, TIDTM and TITDTM [cf. below under A) and C)].

Suitable plasticizers

Examples of suitable organic plasticizers are those from the following groups:

A) Phthalates (esters of phthalic acid)

Examples of these plasticizers are dimethyl, diethyl, dibutyl, dihexyl, di-2-ethylhexyl, di-n-octyl, di-isooctyl, di-isononyl, di-isodecyl, di-isotridecyl, dicyclohexyl, dimethylcyclohexyl, dimethyl glycol, dibutyl glycol, benzyl butyl and diphenyl phthalates, and mixtures of phthalates, such as $C_7$–$C_9$- and $C_9$–$C_{11}$alkyl phthalates made from predominantly linear alcohols, $C_6$–$C_{10}$-n-alkyl phthalates and $C_8$–$C_{10}$-n-alkyl phthalates. Preference is given to dibutyl, dihexyl, di-2-ethylhexyl, di-n-octyl, di-isooctyl, di-isononyl, di-isodecyl, di-isotridecyl and benzyl butyl phthalates, and said mixtures of alkyl phthalates. Particular preference is given to di-2-ethylhexyl, di-isononyl and di-isodecyl phthalate. The abbreviations DOP (dioctyl phthalate, di-2-ethylhexyl phthalate), DINP (diisononyl phthalate) and DIDP (diisodecyl phthalate) are customary.

B) Esters of aliphatic dicarboxylic acids, in particular esters of adipic, azelaic and sebacic acids Examples of these plasticizers are di-2-ethylhexyl adipate, di-isooctyl adipate (mixture), di-isononyl adipate (mixture), di-isodecyl adipate (mixture), benzyl butyl adipate, benzyl octyl adipate, di-2-ethylhexyl azelate, di-2-ethylhexyl sebacate and di-isodecyl sebacate (mixture). Preference is given to di-2-ethylhexyl adipate and di-isooctyl adipate.

C) Esters of trimellitic acid, for example tri-2-ethylhexyl trimellitate, tri-isodecyl trimellitate (mixture), tri-isotridecyl trimellitate, tri-isooctyl trimellitate (mixture) and tri-$C_6$–$C_8$alkyl, tri-$C_6$–$C_{10}$alkyl, tri-$C_7$–$C_9$alkyl and tri-$C_9$–$C_{11}$alkyl trimellitates. The last-mentioned trimellitates are formed by esterifying trimellitic acid by means of the appropriate alkanol mixtures. Preferred trimellitates are tri-2-ethylhexyl trimellitate and said trimellitates made from alkanol mixtures. Customary abbreviations are TOTM (trioctyl trimellitate, tri-2-ethylhexyl trimellitate), TIDTM (triisodecyl trimellitate) and TITDTM (triisotridecyl trimellitate).

D) Epoxy plasticizers

These are principally epoxidized unsaturated fatty acids, for example epoxidized soybean oil.

E) Polymer plasticizers

A definition of these plasticizers and examples thereof are given in "Plastics Additives", edited by R. Gächter and H. Müller, Hanser Verlag, 1990, page 393, chapter 5.9.6, and in "PVC Technology", edited by W.V. Titow, 4th Ed., Elsevier Publ., 1984, pages 165–170. The most usual starting materials for the preparation of polyester plasticizers are: dicarboxylic acids, such as adipic, phthalic, azelaic and sebacic acids; diols, such as 1,2-propanediol, 1,3-butanediol, 1,4-butanediol, 1,6-hexanediol, neopentyl glycol and diethylene glycol; monocarboxylic acids, such as acetic, caproic, caprylic, lauric, myristic, palmitic, stearic, pelargonic and benzoic acids; monofunctional alcohols, such as isooctanol, 2-ethylhexanol, isodecanol and $C_7$–$C_9$alkanol and $C_9$–$C_{11}$alkanol mixtures. Particularly advantageous are polyester plasticizers made from said dicarboxylic acids and monofunctional alcohols.

F) Esters of phosphoric acid

A definition of these esters is given in the abovementioned handbook "Plastics Additives" on page 390, chapter 5.9.5. Examples of these phosphates are tributyl phosphate, tri-2-ethylbutyl phosphate, tri-2-ethylhexyl phosphate, trichloroethyl phosphate, 2-ethylhexyl diphenyl phosphate, cresyl diphenyl phosphate, triphenyl phosphate, tricresyl phosphate and trixylenyl phosphate. Preference is given to tri-2-ethylhexyl phosphate and ®Reofos 50 and 95.

G) Chlorinated hydrocarbons (paraffins)

H) Hydrocarbons

I) Monoesters, for example butyl oleate, phenoxyethyl oleate, tetrahydrofurfuryl oleate, glycerol monooleate and esters of alkylsulfonic acids.

J) Glycol esters, for example diglycol benzoates.

Definitions and examples of plasticizers from groups G) to J) are given in the following handbooks:

"Plastics Additives", edited by R. Gächter and H. Müller, Hanser Verlag, 1990, page 284, chapter 5.9.14.2 (Group G)) and chapter 5.9.14.1 (Group H)).

"PVC Technology", edited by W.V. Titow, 4th Ed., Elsevier Publishers, 1984, pages 171–173, chapter 6.10.2 (Group G)), page 174, chapter 6.10.5 (group H)), page 173, chapter 6.10.3 (group I)) and pages 173–174, chapter 6.10.4 (group J)).

Particular preference is given to plasticizers from groups A) to G), in particular A) to F), especially the plasticizers in these groups which have been mentioned as preferred.

In general, from 5 to 120 parts, in particular from 10 to 100 parts, of the plasticizers from groups A), B), C) and E), from 0.5 to 30 parts, in particular from 0.5 to 20 parts, of those from group D) and from 1 to 100 parts, in particular from 2 to 80 parts, of those from groups F) and G) are present. It is also possible to use mixtures of different plasticizers.

The plasticizers can be used in a total amount of, for example, from 5 to 120 parts by weight, preferably from 10 to 100 pans by weight, in particular from 20 to 70 parts by weight, based on 100 parts by weight of PVC.

Perchlorates

The perchlorates (or perchloric acid) mentioned above as component (b) conform to the formula $M(ClO_4)_n$ where $M^+$ is $H^+$, $NH_4^+$, $Na^+$, $K^+$, $Mg^{2+}$, $Ca^{2+}$, $Ba^{2+}$ or $Al^{3+}$. The index n is 1, 2 or 3, corresponding to the valency of M.

Perchloric acid or the particular perchlorate can be employed in various customary forms, for example as a salt or an aqueous solution coated onto a support material, such as PVC, calcium silicate, zeolites or hydrotalcites, or bonded into a hydrotalcite by chemical reaction.

They can be used in an amount of, for example, from 0.001 to 5 parts by weight, preferably from 0.01 to 3 parts by weight, particularly preferably from 0.01 to 2.0 parts by weight, based on 100 parts by weight of PVC.

Epoxide compounds

The terminal epoxide compounds (c) which can be used for the purposes of the invention can have an aliphatic, aromatic, cycloaliphatic, araliphatic or heterocyclic structure; they contain epoxide groups as side groups. The epoxide groups are preferably bonded to the remainder of the molecule as glycidyl groups via ether or ester bonds, or they are N-glycidyl derivatives of heterocyclic amines, amides or imides. Epoxide compounds of these types are known in general terms and are commercially available.

The epoxide compounds contain at least one epoxide radical of the formula

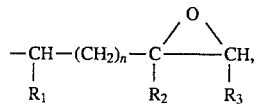

where $R_1$ and $R_3$ are both hydrogen, $R_2$ is hydrogen or methyl, and n is 0, or in which $R_1$ and $R_3$ together are —$CH_2$—$CH_2$— or —$CH_2$—$CH_2$—$CH_2$—, $R_2$ is then hydrogen, and n is 0 or 1 and this epoxide radical is bonded directly to carbon, oxygen, nitrogen or sulfur atoms.

Examples which may be mentioned of epoxide compounds are:

I) Glycidyl and β-methylglycidyl esters obtainable by reacting a compound containing at least one carboxyl group in the molecule and epichlorohydrin or glycerol dichlorohydrin or β-methylepichlorohydrin. The reaction is preferably carried out in the presence of bases.

The compounds containing at least one carboxyl group in the molecule can be aliphatic carboxylic acids. Examples of these carboxylic acids are glutaric acid, adipic acid, pimelic acid, suberic acid, azelaic acid, sebacic acid or dimerized or trimerized linoleic acid, acrylic acid, methacrylic acid, caproic acid, caprylic acid, lauric acid, myristic acid, palmitic acid, stearic acid and pelargonic acid, and the acids mentioned in the case of the organic zinc compounds.

However, it is also possible to employ cycloaliphatic carboxylic acids, for example cyclohexanecarboxylic acid, tetrahydrophthalic acid, 4-methyltetrahydrophthalic acid, hexahydrophthalic acid or 4-methylhexahydrophthalic acid.

It is also possible to use aromatic carboxylic acids, for example benzoic acid, phthalic acid, isophthalic acid, trimellitic acid or pyromellitic acid.

It is likewise possible to use carboxyl-terminated adducts, for example of trimellitic acid and polyols, for example glycerol or 2,2-bis(4-hydroxycyclohexyl)propane.

Other epoxide compounds which can be used for the purposes of the present invention are given in EP 0 506 617.

II) Glycidyl or β-methylglycidyl ethers obtainable by reacting a compound containing at least one free alcoholic hydroxyl group and/or phenolic hydroxyl group and a suitably substituted epichlorohydrin under alkaline conditions, or in the presence of an acid catalyst followed by alkali treatment.

Ethers of this type are derived, for example, from acyclic alcohols, such as ethylene glycol, diethylene glycol and higher poly(oxyethylene) glycols, propane-1,2-diol or poly-(oxypropylene) glycols, propane-1,3-diol, butane-1,4-diol, poly(oxytetramethylene) glycols, pentane-1,5-diol, hexane-1,6-diol, hexane-2,4,6-triol, glycerol, 1,1,1-trimethylolpropane, bistrimethylolpropane, pentaerythritol, sorbitol, and from polyepichlorohydrins, butanol, amyl alcohol, pentanol and from monofunctional alcohols such as isooctanol, 2-ethylhexanol, isodecanol and $C_7$-$C_9$alkanol and $C_9$-$C_{11}$alkanol mixtures.

However, they are also derived, for example, from cycloaliphatic alcohols, such as 1,3- or 1,4-dihydroxycyclohexane, bis(4-hydroxycyclohexyl)methane, 2,2-bis(4-hydroxycyclohexyl)propane or 1,1-bis(hydroxymethyl)cyclohex-3-ene, or they contain aromatic rings, such as N,N-bis(2-hydroxyethyl)aniline or p,p'-bis(2-hydroxyethylamino)diphenylmethane.

The epoxide compounds can also be derived from monocyclic phenols, for example from phenol, resorcinol or hydroquinone; or they are based on polycyclic phenols, for example on bis(4-hydroxyphenyl)methane, 2,2-bis(4-hydroxyphenyl)propane, 2,2-bis(3,5-dibromo-4-hydroxyphenyl)propane, 4,4'-dihydroxydiphenyl sulfone or on condensation products of phenols with formaldehyde obtained under acid conditions, such as phenol novolaks.

Examples of other possible terminal epoxides are: glycidyl 1-naphthyl ether, glycidyl 2-phenylphenyl ether, 2-biphenyl glycidyl ether, N-(2,3-epoxypropyl)phthalimide and 2,3-epoxypropyl 4-methoxyphenyl ether.

III) N-Glycidyl compounds obtainable by dehydrochlorinating the products of the reaction of epichlorohydrin with amines, which contain at least one amino hydrogen atom. These amines are, for example, aniline, N-methylaniline, toluidine, n-butylamine, bis(4-aminophenyl)methane, m-xylylenediamine or bis(4-methylaminophenyl)methane, but also N,N,O-triglycidyl-m-aminophenol or N,N,O-triglycidyl-p-aminophenol.

However, the N-glycidyl compounds also include N,N'-di-, N,N',N''-tri- and N,N',N'',N'''-tetraglycidyl derivatives of cycloalkyleneureas, such as ethyleneurea or 1,3-propyleneurea, and N,N-diglycidyl derivatives of hydantoins, such as of 5,5-dimethylhydantoin or glycol uril and triglycidyl isocyanurate.

IV) S-Glycidyl compounds, for example di-S-glycidyl derivatives derived from dithiols, for example ethane-1,2-dithiol or bis(4-mercaptomethylphenyl) ether.

V) Epoxide compounds containing a radical of the formula I in which $R_1$ and $R_3$ together are —$CH_2$—$CH_2$—, and n is 0, are bis(2,3-epoxycyclopentyl) ether, 2,3-epoxycyclopentyl glycidyl ether or 1,2-bis(2,3-epoxycyclopentoxy)ethane. An example of an epoxy resin containing a radical of the formula I in which $R_1$ and $R_3$ together are —$CH_2$—$CH_2$— and n is 1 is 3'4'-epoxy-6'-methylcyclohexyl)methyl 3,4-epoxy-6-methylcyclohexanecarboxylate.

Examples of suitable terminal epoxides are:

a) liquid bisphenol A diglycidyl ethers, such as Araldit®GY 240, Araldit®GY 250, Araldit®GY 260, Araldit®GY 266, Araldit®GY 2600, Araldit®MY 790;

b) solid bisphenol A diglycidyl ethers, such as Araldit®GT 6071, Araldit®GT 7071, Araldit®GT 7072, Araldit®GT 6063, Araldit®GT 7203, Araldit®GT 6064, Araldit®GT 7304, Araldit®GT 7004, Araldit®GT 6084, Araldit®GT 1999, Araldit®GT 7077, Araldit®GT 6097, Araldit®GT 7097, Araldit®GT 7008, Araldit®GT 6099, Araldit®GT 6608, Araldit®GT 6609, Araldit®GT 6610 c) liquid bisphenol F diglycidyl ethers, such as Araldit®GY 281, Araldit®PY 302, Araldit®PY 306;

d) solid polyglycidyl ethers of tetraphenylethane, such as CG Epoxy Resin®0163;

e) solid and liquid polyglycidyl ethers of phenol-formaldehyde novolak, such as EPN 1138, EPN 1139, GY 1180, PY 307;

f) solid and liquid polyglycidyl ethers of o-cresol-formaldehyde novolak, such as ECN 1235, ECN 1273, ECN 1280, ECN 1299;

g) liquid glycidyl ethers of alcohols, such as Shell®glycidyl ether 162, Araldit®DY 0390, Araldit®DY 0391;

h) liquid glycidyl ethers of carboxylic acids, such as Shell®Cardura E terephthalates, trimellitates, Araldit®PY 284;

i) solid heterocyclic epoxy resins (triglycidyl isocyanurates), such as Araldit® PT 810;

j) liquid cycloaliphatic epoxy resins, such as Araldit® CY 179;

k) liquid N,N,O-triglycidyl ether of p-aminophenol, such as Araldit®MY 05 10;

l) tetraglycidyl-4,4'-methylenebenzamine or N,N,N',N'-tetraglycidyldiaminophenylmethane, such as Araldit®MY 720, Araldit®MY 721.

Preference is given to epoxide compounds containing two functional groups. However, it is in principle possible for epoxide compounds containing one, three or more functional groups to be used.

Predominantly employed are epoxide compounds, in particular diglycidyl compounds, having aromatic groups.

If desired, a mixture of different epoxide compounds can also be employed.

Particularly preferred terminal epoxide compounds are diglycidyl ethers based on bisphenols, for example on 2,2-bis(4-hydroxyphenyl)propane (bisphenol A), bis(4-hydroxyphenyl)methane or mixtures of bis(ortho/para-hydroxyphenyl)methane (bisphenol F).

The terminal epoxide compounds can be employed in an amount of preferably at least 0.1 part by weight, for example from 0.1 to 50 parts by weight, preferably from 1 to 30 parts by weight, in particular from 1 to 25 parts by weight, based on 100 parts by weight of PVC.

The flexible PVC stabilized according to the invention may contain further additives. These are, for example, fillers and reinforcing materials (for example calcium carbonate, silicates, glass fibres, talc, kaolin, chalk, mica, metal oxides and hydroxides, carbon black or graphite), metal soaps and other metal stabilizers, antioxidants, polyols, zeolites, dawsonites, hydrotalcites, organic phosphites, 1,3-diketo compounds, dihydropyridines, α-phenylindole, pyrroles, β-naphthol, hydroxydiphenylamines, sterically hindered amines (HALS), light stabilizers, UV absorbers, lubricants, fatty acid esters, paraffins, blowing agents, optical brighteners, pigments, flameproofing agents, antistatics, β-aminocrotonates (for example as mentioned in EP 0 465 405, p. 6, lines 9–14), phosphates, thiophosphates, gelling aids, peroxide-scavengers, modifiers and further complexing agents for Lewis acids.

Fillers

The fillers used are, for example, chalk, kaolin, china clay, talc, silicates, glass fibres, glass beads, sawdust, mica, metal oxides or hydroxides, carbon black, graphite, rock flour and barytes. Preference is given to talc and chalk.

The fillers can be employed in an amount of, preferably, at least 1 part by weight, for example from 5 to 200 parts by weight, preferably from 10 to 150 parts by weight, in particular from 15 to 100 parts by weight, based on 100 parts by weight of PVC.

Metal soaps

Metal soaps are principally metal carboxylates, preferably of long-chain carboxylic acids. Customary examples are stearates and laurates, but also oleates and salts of relatively short-chain alkylcarboxylic acids. Metal soaps also include alkylbenzoic acids. Use is frequently made of synergistic mixtures, such as barium/zinc, magnesium/zinc, calcium/zinc or calcium/magnesium/zinc stabilizers. Metal soaps can be employed individually or as mixtures. A review of customary metal soaps is given in Ullmann's Encyclopedia of Industrial Chemistry, 5th Ed., Vol. A16 (1985), pp. 361 ff.).

Preference is given to organic metal soaps from the series consisting of aliphatic saturated $C_2$–$C_{22}$carboxylates, aliphatic unsaturated $C_3$–$C_{22}$carboxylates, aliphatic $C_2$–$C_{22}$carboxylates which are substituted by at least one OH group, cyclic and bicyclic carboxylates having 5–22 carbon atoms, unsubstituted, at least mono-OH-substituted and/or $C_1$–$C_{16}$alkyl-substituted phenylcarboxylates, unsubstituted, at least mono-OH-substituted and/or $C_1$–$C_{16}$alkyl-substituted naphthylcarboxylates, phenyl-$C_1$–$C_{16}$alkylcarboxylates, naphthyl-$C_1$–$C_{16}$alkylcarboxylates or unsubstituted or $C_1$–$C_{12}$alkyl-substituted phenolates, tallates and resinates.

Specific mention may be made by way of example of zinc, calcium, magnesium or barium salts of monovalent carboxylic acids, such as acetic acid, propionic acid, butyric acid, valeric acid, hexanoic acid, oenanthic acid, octanoic acid, neodecanoic acid, 2-ethylhexanoic acid, pelargonic acid, decanoic acid, undecanoic acid, dodecanoic acid, tridecanoic acid, myristic acid, palmitic acid, isostearic acid, stearic acid, 12-hydroxystearic acid, behenic acid, benzoic acid, p-tert-butylbenzoic acid, dimethylhydroxybenzoic acid, 3,5-di-ten-butyl-4-hydroxybenzoic acid, tolic acid, dimethylbenzoic acid, ethylbenzoic acid, n-propylbenzoic acid, salicylic acid, p-tert-octylsalicylic acid and sorbic acid; calcium, magnesium and zinc salts of monoesters of divalent carboxylic acids, such as oxalic acid, malonic acid, succinic acid, glutaric acid, adipic acid, fumaric acid, pentane-1,5-dicarboxylic acid, hexane-1,6-dicarboxylic acid, heptane-1,7-dicarboxylic acid, octane-1,8-dicarboxylic acid, phthalic acid, isophthalic acid, terephthalic acid and hydroxyphthalic acid; and di- or triesters of tri- or tetravalent carboxylic acids, such as hemimellitic acid, trimellitic acid, pyromellitic acid and citric acid.

Preference is given to calcium, magnesium and zinc carboxylates of carboxylic acids having 7 to 18 carbon atoms (metal soaps in the stricter sense), for example benzoates or alkanoates, preferably stearates, oleates, laurates, palmitates, behenates, hydroxystearates, dihydroxystearates or 2-ethylhexanoates. Particular preference is given to stearates, oleates and p-tert-butylbenzoates. Superbasic carboxylates, such as superbasic zinc octanoate, are also preferred.

It is also possible to use a mixture of carboxylates having different structures. Preference is given to compositions as described above comprising an organic zinc and/or calcium compound.

In addition to said compounds, organic aluminium compounds are also suitable, in particular compounds analogous to those mentioned above. Further details of the preferred aluminium compounds which can be used are given in U.S. Pat. No. 4,060,512 and U.S. Pat. No. 3,243,394.

Suitable compounds, in addition to those mentioned above, are also organic rare-earth compounds, in particular compounds analogous to those mentioned above. The term rare-earth compound is taken to mean, in particular, compounds of the elements cerium, praseodymium, neodymium, samarium, europium, gadolinium, terbium, dysprosium, holmium, erbium, thulium, ytterbium, lutetium, lanthanum and yttrium, mixtures, in particular with cerium, being preferred.

Further preferred rare-earth compounds are given in EP-A-0 108 023.

It is also possible to employ a mixture of zinc compounds, alkaline earth metal compounds, aluminium compounds, lanthanum compounds and lanthanoid compounds having different structures. Organic zinc, aluminium, lanthanum or lanthanoid compounds can also be coated onto an alumo salt compound; cf. also DE-A-4 031 818.

The metal soaps or mixtures thereof can be used in an amount of, for example, from 0.001 to 10 parts by weight, preferably from 0.01 to 8 parts by weight, particularly preferably from 0.05 to 5 parts by weight, based on 100 parts by weight of PVC. The same applies to the other metal stabilizers:

Other metal stabilizers

Specific mention may be made of organotin stabilizers. These are, in particular, carboxylates, mercaptides and sulfides. Suitable compounds are described in U.S. Pat. No. 4,743,640 (columns 3–5).

β-Diketones 1,3-Dicarbonyl compounds which can be used can be linear or cyclic dicarbonyl compounds. Preference is given to dicarbonyl compounds of the formula

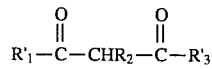

in which $R'_1$ is $C_1$–$C_{22}$alkyl, $C_5$–$C_{10}$hydroxyalkyl, $C_2$–$C_8$alkenyl, phenyl, phenyl which is substituted by OH, $C_1$–$C_4$alkyl, $C_1$–$C_4$alkoxy or halogen, $C_7$–$C_{10}$phenylalkyl, $C_5$–$C_{12}$cycloalkyl, $C_5$–$C_{12}$cycloalkyl which is substituted by $C_1$–$C_4$alkyl, or an —$R_5$—S—$R_6$ or —$R_5$—O—$R_6$ group, $R'_2$ is hydrogen, $C_1$–$C_8$alkyl, $C_2$–$C_{12}$alkenyl, phenyl, $C_7$–$C_{12}$alkylphenyl, $C_7$–$C_{10}$phenylalkyl or a —CO—$R_4$ group, $R'_3$ has one of the meanings given for $R'_1$ or is $C_1$–$C_{18}$alkoxy, $R_4$ is $C_1$–$C_4$alkyl or phenyl, $R_5$ is $C_1$–$C_{10}$alkylene, and $R_6$ is $C_1$–$C_{12}$alkyl, phenyl, $C_7$–$C_{18}$alkylphenyl or $C_7$–$C_{10}$phenylatkyl.

These include the hydroxyl-containing diketones of EP-A-346 279 and the oxa- and thiadiketones of EP-A-307 358, and the isocyanuric acid-based diketones of U.S. Pat. No. 4,339,383.

Alkyl $R'_1$ and $R'_3$ can be, in particular, $C_1$–$C_{18}$alkyl, for example methyl, ethyl, n-propyl, isopropyl, n-butyl, tert-butyl, pentyl, hexyl, heptyl, octyl, decyl, dodecyl or octadecyl.

Hydroxyalkyl $R'_1$ and $R'_3$ are, in particular, a —$(CH_2)_n$—OH group, in which n is 5, 6 or 7.

Alkenyl $R'_1$ and $R'_3$ can be, for example, vinyl, allyl, methallyl, 1-butenyl, 1-hexenyl or oleyl, preferably allyl.

OH—, alkyl-, alkoxy- or halogen-substituted phenyl $R'_1$ and $R'_3$ can be, for example, tolyl, xylyl, tert-butylphenyl, methoxyphenyl, ethoxyphenyl, hydroxyphenyl, chlorophenyl or dichlorophenyl.

Phenylalkyl $R'_1$ and $R'_3$ are, in particular, benzyl. Cycloalkyl or alkylcycloalkyl $R'_2$ and $R'_3$ are, in particular, cyclohexyl or methylcyclohexyl.

Alkyl $R'_2$ can be, in particular, $C_1$–$C_4$alkyl. $C_2$–$C_{12}$alkenyl $R'_2$ can be, in particular, allyl. Alkylphenyl $R'_2$ can be, in particular, tolyl. Phenylalkyl $R'_2$ can be, in particular, benzyl. $R'_2$ is preferably hydrogen. Alkoxy $R'_3$ can be, for example, methoxy, ethoxy, butoxy, hexyloxy, octyloxy, dodecyloxy, tridecyloxy, tetradecyloxy, or octadecyloxy. $C_1$–$C_{10}$alkylene $R_5$ is, in particular, $C_2$–$C_4$alkylene. Alkyl $R_6$ is, in particular, $C_4$–$C_{12}$alkyl, for example butyl, hexyl, octyl, decyl or dodecyl. Alkylphenyl $R_6$ is, in particular, tolyl. Phenylalkyl $R_6$ is, in particular, benzyl.

Examples of 1,3-dicarbonyl compounds of the above formula are acetylacetone, butanoylacetone, heptanoylacetone, stearoylacetone, palmitoylacetone, lauroylacetone, 7-tert-nonylthioheptane-2,4-dione, benzoylacetone, dibenzoylmethane, lauroylbenzoylmethane, palmitoylbenzoylmethane, stearoylbenzoylmethane, isooctylbenzoylmethane, 5-hydroxycaproylbenzoylmethane, tribenzoylmethane, bis(4-methylbenzoyl)methane, benzoyl-p-chlorobenzoylmethane, bis(2-hydroxybenzoyl)methane, 4-methoxybenzoylbenzoylmethane, bis(4-methoxybenzoyl)methane, 1-benzoyl-1-acetylnonane, benzoylacetylphenylmethane, stearoyl-4-methoxybenzoylmethane, bis(4-tert-butylbenzoyl)methane, benzoylformylmethane, benzoylphenylacetylmethane, bis(cyclohexanoyl)methane, di(pivaloyl)methane, methyl, ethyl, hexyl, octyl, dodecyl or octadecyl acetoacetate, ethyl, butyl, 2-ethylhexyl, dodecyl or octadecyl benzoylacetate, ethyl, propyl, butyl, hexyl or octyl stearoyl acetate and dehydracetic acid, and the zinc, calcium, or magnesium salts thereof.

Preference is given to 1,3-diketo compounds of the above formula in which $R'_1$ is $C_1$–$C_{18}$alkyl, phenyl, phenyl which is substituted by OH, methyl or methoxy, $C_7$–$C_{10}$phenylalkyl or cyclohexyl, $R'_2$ is hydrogen, and $R'_3$ has one of the meanings given for $R'_1$.

The 1,3-diketo compounds can be used in an amount of, for example, from 0.01 to 10 parts by weight, preferably from 0.01 to 3 pans by weight, in particular from 0.01 to 2 pans by weight, based on 100 pans of weight of PVC.

Examples of suitable antioxidants are:

1. Alkylated monophenols, for example 2,6-di-tert-butyl-4-methylphenol, 2-butyl-4,6-dimethylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-(α-methylcyclohexyl)-4,6-dimethylphenol, 2,6-dioctadecyl-4-methylphenol, 2,4,6-tricyclohexylphenol, 2,6-di-tert-butyl-4-methoxymethylphenol, 2,6-dinonyl-4-methylphenol, 2,4-dimethyl-6-(1'-methylundec-1'-yl)phenol, 2,4-dimethyl-6-(1'-methylheptadec-1'-yl)phenol, 2,4-dimethyl-6-(1'-methyltridec-1'-yl)phenol, octylphenol, nonylphenol and mixtures thereof.

2. Alkylthiomethylphenols, for example 2,4-dioctylthiomethyl-6-tert-butylphenol, 2,4-dioctylthiomethyl-6-methylphenol, 2,4-dioctylthiomethyl-6-ethylphenol, 2,6-didodecylthiomethyl-4-nonylphenol.

3. Hydroquinones and alkylated hydroquinones, for example 2,6-di-tert-butyl-4-methoxyphenol, 2,5-di-tert-butyl-hydroquinone, 2,5-di-tert-amyl-hydroquinone, 2,6-diphenyl-4-octadecyloxyphenol, 2,6-di-tert-butyl-hydroquinone, 2,5-di-tert-butyl-4-hydroxyanisole, 3,5-di-tert-butyl-4-hydroxyanisole, 3,5-di-ten-butyl-4-hydroxyphenyl stearate, bis(3,5-di-ten-butyl-4-hydroxyphenyl)adipate.

4. Hydroxylated diphenyl thioethers, for example 2,2'-thiobis(6-tert-butyl-4-methylphenol), 2,2'-thiobis(4-octylphenol), 4,4'-thiobis(6-tert-butyl-3-methylphenol), 4,4'-thiobis(6-tert-butyl-2-methylphenol), 4,4'-thiobis(3,6-di-sec-amylphenol), 4,4'-bis(2,6-dimethyl-4-hydroxyphenyl)disulfide.

5. Alkylidenebisphenols, for example 2,2'-methylene-bis(6-tert-butyl-4-methylphenol), 2,2'-methylene-bis(6-tert-butyl-4-ethylphenol), 2,2'-methylene-bis[4-methyl-6-(α-methylcyclohexyl)phenol], 2,2'-methylene-bis(4-methyl-6-cyclohexylphenol), 2,2'-methylene-bis(6-nonyl-4-methylphenol), 2,2'-methylene-bis(4,6-di-tert-butylphenol), 2,2'-ethylidene-bis(4,6-di-tert-butylphenol), 2,2'-ethylidene-bis(6-tert-butyl-4-isobutylphenol), 2,2'-methylene-bis[6-(α-methylbenzyl)-4-nonylphenol], 2,2'-methylene-bis[6-(α,α-dimethylbenzyl)-4-nonylphenol], 4,4'-methylene-bis(2,6-di-tert-butylphenol), 4,4'-methylene-bis(6-tert-butyl-2-methylphenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis(5-tert-butyl-4-hydroxy-2-methylphenyl)-3-n-dodecylmercaptobutane, ethylene glycol bis[3,3-bis(3'-tert-butyl-4'-hydroxyphenyl)butyrate], bis(3-tert-butyl-4-hydroxy-5-methylphenyl)dicyclopentadiene, bis[2-(3'-tert-butyl-2'-hydroxy-5'-methylbenzyl)-6-tert-butyl-4-methyl-phenyl]terephthalate, 1,1-bis(3,5-dimethyl-2-hydroxyphenyl)butane, 2,2-bis(3,5-di-tert-butyl-4-hydroxyphenyl)propane, 2,2-bis(4-hydroxyphenyl)propane, 2,2-bis(5-tert-butyl-4-hydroxy-2-methylphenyl)-4-n-dodecylmercaptobutane, 1,1,5,5-tetra(5-tert-butyl-4-hydroxy-2-methylphenyl)pentane.

6. O-, N- and S-benzyl compounds, for example 3,5,3',5'-tetra-tert-butyl-4,4'-dihydroxydibenzyl ether, octadecyl 4-hydroxy-3,5-dimethylbenzylmercaptoacetate, tris(3,5-di-tert-butyl-4-hycIroxybenzyl)amine, bis(4-tert-butyl-3-hydroxy-2,6-dimethylbenzyl)dithioterephthalate, bis(3,5-di-tert-butyl-4-hydroxybenzyl)sulfide, isooctyl 3,5-di-tert-butyl-4-hydroxybenzylmercaptoacetate.

7. Hydroxybenzylated malonates, for example dioctadecyl 2,2-bis(3,5-di-tert-butyl-2-hydroxybenzyl)malonate, dioctadecyl 2-(3-tert-butyl-4-hydroxy-5-methylbenzyl)malonate, didodecylmercaptoethyl 2,2-bis(3,5-di-tert-butyl-4-hydroxybenzyl)malonate, di[4-(1,1,3,3-tetramethylbutyl)phenyl]2,2-bis(3,5-di-tert-butyl-4-hydroxybenzyl)malonate.

8. Hydroxybenzyl aromatic compounds, for example 1,3,5-tris(3,5-di-tert-butyl-4-hydroxybenzyl)-2,4,6-trimethylbenzene, 1,4-bis(3,5-di-tert-butyl-4-hydroxybenzyl)-2,3,5,6-tetramethylbenzene, 2,4,6-tris(3,5-di-tert-butyl-4-hydroxybenzyl)phenol.

9. Triazine compounds, for example 2,4-bisoctylmercapto-6-(3,5-di-tert-butyl-4-hydroxYanilino)-1,3,5-triazine, 2-octylmercapto-4,6-bis(3,5-di-tert-butyl-4-hydroxyanilino)-1,3,5-triazine, 2-octylmercapto-4,6-bis(3,5-di-tert-butyl-4-hydroxyphenoxy)-1,3,5-triazine, 2,4,6-tris(3,5-di-tert-butyl-4-hydroxyphenoxy)-1,2,3-triazine, 1,3,5-tris(3,5-di-tert-butyl-4-hydroxybenzyl) isocyanurate, 1,3,5-tris(4-tert-butyl-3-hydroxy-2,6-dimethylbenzyl) isocyanurate, 2,4,6-tris(3,5-di-tert-butyl-4-hydroxyphenylethyl)-1,3,5-triazine, 1,3,5-tris(3,5-di-tert-butyl-4-hydroxyphenylpropionyl)hexahydro-1,3,5-triazine, 1,3,5-tris(3,5-dicyclohexyl-4-hydroxybenzyl) isocyanurate.

10. Phosphonates, phosphites and phosphonites, for example dimethyl 2,5-di-tert-butyl-4-hydroxybenzylphosphonate, diethyl 3,5-di-tert-butyl-4-hydroxybenzylphosphonate, dioctadecyl 3,5-di-tert-butyl-4-hydroxybenzylphosphonate, dioctadecyl 5-tert-butyl-4-hydroxy-3-methylbenzylphosphonate, the calcium salt of monoethyl 3,5-di-tert-butyl-4-hydroxybenzyl phosphonate, triphenyl phosphite, diphenyl alkyl phosphites, phenyl dialkyl phosphites, tris(nonylphenyl) phosphite, trilauryl phosphite, trioctadecyl phosphite, distearyl pentaerythrityl diphosphite, tris(2,4-di-tert-butylphenyl) phosphite, diisodecyl pentaerythrityl diphosphite, bis(2,4-di-tert-butylphenyl) pentaerythrityl diphosphite, bis(2,6-di-tert-butyl-4-methylphenyl) pentaerythrityl diphosphite, bisisodecyloxy pentaerythrityl diphosphite, bis(2,4-di-tert-butyl-6-methylphenyl) pentaerythrityl diphosphite, bis(2,4,6-tri-tert-butylphenyl) pentaerythrityl diphosphite, tristearyl sorbitol triphosphite, tetrakis(2,4-di-tert-butylphenyl)-4,4'-biphenylene diphosphonite, 6-isooctyloxy-2,4,8,10-tetra-tert-butyl-12H-dibenz[d,g]-1,3,2-dioxaphosphocine, 6-fluoro-2,4, 8,10-tetra-tert-butyl-12-methyldibenz[d,g]-1,3,2-dioxaphosphocine, bis(2,4-di-tert-butyl-6-methylphenyl) methyl phosphite, bis(2,4-di-tert-butyl-6-methylphenyl) ethyl phosphite $(C_9H_{19}\text{—}C_6H_4\text{—}O)_{1.5}\text{—}P\text{—}(O\text{—}C_{12-13}H_{25-27})_{1.5}$.

11. Acylaminophenols, for example 4-hydroxylauranilide, 4-hydroxystearanilide, octyl N-(3,5-di-tert-butyl-4-hydroxyphenyl)carbamate.

12. Esters of β-(3,5-di-tert-butyl-4-hydroxyphenyl)propionic acid with monohydric or polyhydric alcohols, for example with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, dipentaerythritol, tris(hydroxyethyl) isocyanurate, N,N'-bis(hydroxyethyl)oxalamide, 3-thiaundecanol, 3-thiapentadecanol, trimethylhexanediol, trimethylolpropane, ditrimethylolpropane, 4-hydroxymethyl-1-phospha-2,6,7-trioxabicyclo-[2.2.2]-octane.

13. Esters of β-(5-tert-butyl-4-hydroxy-3-methylphenyl)propionic acid with monohydric or polyhydric alcohols, for example with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis(hydroxyethyl)oxalamide, 3-thiaundecanol, 3-thiapentadecanol, trimethylhexanediol, trimethylolpropane, 4-hydroxymethyl-1-phospha-2,6,7-trioxabicyclo-[2.2.2]-octane.

14. Esters of β-(3,5-dicyclohexyl-4-hydroxyphenyl)propionic acid with monohydric or polyhydric alcohols, for example with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis(hydroxyethyl)oxalamide, 3-thiaundecanol, 3-thiapentadecanol, trimethylhexanediol, trimethylolpropane, 4-hydroxymethyl-1-phospha-2,6,7-trioxabicyclo-[2.2.2 ]-octane.

15. Esters of 3,5-di-tert-butyl-4-hydroxyphenylacetic acid with monohydric or polyhydric alcohols, for example with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis(hydroxyethyl)oxalamide, 3-thiaundecanol, 3-thiapentadecanol, trimethylhexanediol, trimethylolpropane, 4-hydroxymethyl-1-phospha-2,6,7-trioxabicyclo-[2.2.2]-octane.

16. Amides of β-(3,5-di-tert-butyl-4-hydroxyphenyl)propionic acid, for example N,N'-bis(3,5-di-tert-butyl-4-hydroxyphenylpropionyl)hexamethylenediamine, N,N'-bis(3,5-di-tert-butyl-4-hydroxyphenylpropionyl)trimethylenediamine, N,N'-bis(3,5-di-tert-butyl-4-hydroxyphenylpropionyl)hydrazine.

Preference is given to antioxidants from groups 1–5, 10 and 12, in particular 2,2-bis(4-hydroxyphenyl)propane, esters of 3,5-di-tert-butyl-4-hydroxyphenylpropionic acid with octanol, octadecanol or pentaerythritol, or tris(2,4-di-tert-butylphenyl) phosphite.

If desired, a mixture of antioxidants of different structures can also be employed.

The antioxidants can be used in an amount of, for example, 0.01 to 10 parts by weight, preferably from 0.1 to 10 parts by weight, in particular from 0.1 to 5 parts by weight, based on 100 parts by weight of PVC.

Examples of suitable UV absorbers and light stabilizers are:

1. 2-(2'-Hydroxyphenyl)benzotriazoles, for example 2-(2'-hydroxy-5'-methylphenyl)benzotriazole, 2-(3',5'-di-tert-butyl-2'-hydroxyphenyl)benzotriazole, 2-(5'-tert-butyl-2'-hydroxyphenyl)benzotriazole, 2-(2'-hydroxy-5'-(1,1,3,3-tetramethylbutyl)phenyl)benzotriazole, 2-(3',5'-di-tert-butyl-2'-hydroxyphenyl)-5-chlorobenzotriazole, 2-(3'-tert-butyl-2'-hydroxy-5'-methylphenyl)-5-chlorobenzotriazole, 2-(3'-sec-butyl-5'-tert-butyl-2'-hydroxyphenyl)benzotriazole, 2-(2'-hydroxy-4'-octoxyphenyl)benzotriazole, 2-(3',5'-di-tert-amyl-2'-hydroxyphenyl)benzotriazole, 2-(3',5'-bis(α,α-dimethylbenzyl)-2'-hydroxyphenyl)benzotriazole mixture of 2-(3'-tert-butyl-2'-hydroxy-5'-(2-octyloxycarbonylethyl)phenyl)-5-chlorobenzotriazole, 2-(3'-tert-butyl-5'-[2-(2-ethylhexyloxy)carbonylethyl]-2'-hydroxyphenyl)-5-chlorobenzotriazole, 2-(3'-tert-butyl-2'-hydroxy-5'-(2-methoxycarbonylethyl)phenyl)-5-chlorobenzotriazole, 2-(3'-tert-butyl-2'-hydroxy-5'-(2-methoxycarbonylethyl)phenyl)benzotriazole, 2-(3'-tert-butyl-2'-hydroxy-5'-(2-octyloxycarbonylethyl)phenyl)benzotriazole, 2-(3'-tert-butyl-5'-[2-(2-ethylhexyloxy)carbonylethyl]-2'-hydroxyphenyl)benzotriazole, 2-(3'-dodecyl-2'-hydroxy-5'-methylphenyl)benzotriazole, and 2-(3'-tert-butyl-2'-hydroxy-5'-(2-isooctyloxycarbonylethyl)phenylbenzotriazole, 2,2'-methylenebis[4-(1,1,3,3-tetramethylbutyl)-6-benzotriazol-2-yl phenol]; transesterification product of 2-[3'-tert-butyl-5'-(2-methoxycarbonylethyl)-2'-hydroxyphenyl] benzotriazole with polyethylene glycol 300; [R—CH₂CH₂—COO(CH₂)₃]₂ where R=3'-tert-butyl-4'-hydroxy-5'-2H-benzotriazol-2-yl phenyl.

2. 2-Hydroxybenzophenones, for example the 4-hydroxy, 4-methoxy, 4-octoxy, 4-decyloxy, 4-dodecyloxy, 4-benzyloxy, 4,2',4'-trihydroxy and 2'-hydroxy-4,4'-dimethoxy derivatives.

3. Esters of unsubstituted or substituted benzoic acids, for example 4-tert-butyl-phenyl salicylate, phenyl salicylate, octylphenyl salicylate, dibenzoylresorcinol, bis(4-tert-butyl-benzoyl)resorcinol, benzoylresorcinol, 2,4-di-tert-butylphenyl 3,5-di-tert-butyl-4-hydroxybenzoate, hexadecyl 3,5-di-tert-butyl-4-hydroxybenzoate, octadecyl 3,5-di-tert-butyl-4-hydroxybenzoate, 2-methyl-4,6-di-tert-butylphenyl 3,5-di-tert-butyl-4-hydroxybenzoate.

4. Acrylates, for example ethyl and isooctyl α-cyano-β,β-diphenylacrylate, methyl α-carbomethoxycinnamate, methyl and butyl α-cyano-β-methyl-p-methoxycinnamate, methyl α-carbomethoxy-p-methoxycinnamate and N-(β-carbomethoxy-β-cyanovinyl)-2-methylindoline.

5. Nickel compounds, for example nickel complexes of 2,2'-thiobis[4-(1,1,3,3-tetramethylbutyl)phenol], such as the 1:1 and 1:2 complexes, if desired with additional ligands, such as n-butylamine, triethanolamine or N-cyclohexyldiethanolamine, nickel dibutyldithiocarbamate, nickel salts of monoalkyl esters, such as the methyl or ethyl esters, of 4-hydroxy-3,5-di-tert-butylbenzylphosphonic acid, nickel complexes of ketoximes, such as of 2-hydroxy-4-methylphenyl undecyl ketoxime, and nickel complexes of 1-phenyl-4-lauroyl-5-hydroxypyrazole, if desired with additional ligands.

6. Sterically hindered amines, for example bis(2,2,6,6-tetramethylpiperidyl) sebacate, bis(2,2,6,6-tetramethylpiperidyl) succinate, bis(1,2,2,6,6-pentamethylpiperidyl) sebacate, bis(1,2,2,6,6-pentamethylpiperidyl) n-butyl-3,5-di-tert-butyl-4-hydroxybenzylmalonate, the product of the condensation of 1-hydroxyethyl-2,2,6,6-tetramethyl-4-hydroxypiperidine and succinic acid, the product of the condensation of N,N'-bis(2,2,6,6-tetramethyl-4-piperidyl)hexamethylenediamine and 4-tert-octylamino-2,6-dichloro-1,3, 5-s-triazine, tris(2,2,6,6-tetramethyl-4-piperidyl) nitrilotriacetate, tetrakis(2,2,6,6-tetramethyl-4-piperidyl) 1,2,3,4-butanetetraoate, 1,1'-(1,2-ethanediyl)his(3,3,5,5-tetramethylpiperazinone), 4-benzoyl-2,2,6,6-tetramethylpiperidine, 4-stearyloxy-2,2,6,6-tetramethylpiperidine, bis(1,2, 2,6,6pentamethylpiperidyl) 2-n-butyl-2-(2-hydroxy-3,5-di-tert-butylbenzyl)malonate, 3-n-octyl-7,7,9,9-tetramethyl-1,3,8-triazaspiro[4.5]decane-2,4-dione, bis(1-octyloxy-2,2,6,6-tetramethylpiperidyl) sebacate, his(1-octyloxy-2,2,6,6-tetramethylpiperidyl) succinate, the product of the condensation of N,N'-bis(2,2,6,6-tetramethyl-4-piperidyl)hexamethylene diamine and 4-morpholino-2,6-dichloro-1,3,5-triazine, the product of the condensation of 2-chloro-4,6-di(4-n-butylamino-2,2,6,6-tetramethylpiperidyl)-1,3,5-triazine and 1,2-bis(3-aminopropylamino)ethane, the product of the condensation of 2-chloro-4,6-di(4-n-butylamino-1,2,2,6,6-pentamethylpiperidyl)-1,3,5-triazine and 1,2-bis(3-aminopropylamino)ethane, 8-acetyl-3-dodecyl-7,7,9,9-tetra-methyl-1,3,8-triazaspiro[4.5 ]decane-2,4-dione, 3-dodecyl-1-(2,2,6,6-tetramethyl-4-piperidyl)pyrrolidine-2,5-dione, 3-dodecyl-1-(1,2,2,6,6-pentamethyl-4-piperidyl)pyrrolidine-2,5-dione.

7. Oxalamides, for example 4,4'-dioctyloxyoxanilide, 2,2'-dioctyloxy-5,5'-di-tert-butyloxanilide, 2,2'-didodecyloxy-5,5'-di-tert-butyloxanilide, 2-ethoxy-2'-ethyloxanilide, N,N'-bis(3-dimethylaminopropyl)oxalamide, 2-ethoxy-5-tert-butyl-2'-ethyloxanilide and mixtures thereof with 2-ethoxy-2'-ethyl-5,4'-di-tert-butyloxanilide, and mixtures of o- and p-methoxy- and of o- and p-ethoxy-disubstituted oxanilides.

8. 2-(2-Hydroxyphenyl)-1,3,5-triazines, for example 2,4,6-tris(2-hydroxy-4-octyloxyphenyl)-1,3,5-triazine, 2-(2-hydroxy-4-octyloxyphenyl)-4,6-bis(2,4-dimethylphenyl)-1,3,5-triazine, 2-(2,4-dihydroxyphenyl)-4,6-bis(2,4-dimethylphenyl)-1,3,5-triazine, 2,4ẓbis(2-hydroxy-4-propyloxyphenyl)-6-(2,4-dimethylphenyl)-1,3,5-triazine, 2-(2-hydroxy-4-octyloxyphenyl)-4,6-bis(4-methylphenyl)-1,3,5-triazine, 2-(2-hydroxy-4-dodecyloxyphenyl)-4,6-bis(2,4-dimethylphenyl)-1,3,5-triazine, 2-[2-hydroxy-4-(2-hydroxy-3-butoxypropoxy)phenyl]-4,6-bis(2,4-dimethylphenyl)-1,3,5-2-[2-hydroxy-4-(2-hydroxy-3-octyloxypropoxy)phenyl]-4,6-bis(2,4-dimethylphenyl)-1,3,5-triazine.

Examples of suitable peroxide scavengers are: esters of β-thiodipropionic acid, for example the lauryl, stearyl, myristyl or tridecyl esters, mercaptobenzimidazole, the zinc salt of 2-mercaptobenzimidazole, zinc dibutyldithiocarbamate, dioctadecyl disulfide, pentaerythrityl tetrakis(β-dodecylmercapto)propionate and ethylene glycol bismercaptoacetate.

Examples of suitable lubricants are: montan wax, fatty acid esters, complex esters, PE waxes, amide waxes, chlorinated paraffins, glycerol esters and alkaline earth metal soaps. Lubricants which can be used are also described in "Plastics Additives", edited by R. Gächter and H. Müller, Hanser Verlag, 3rd Edition, 1990, Chapter 6, pages 423–480, and in "Kunststoff-Handbuch PVC" [Plastics Handbook PVC],2/1,20th Edn., 1986, pp. 570–595.

Examples of other metal-free stabilizers which can be used are β-naphthol, hydroxydiphenylamine, α-phenylindole, β-aminocrotonates and pyrroles, as described, for example, in EP-A-465 405.

Examples of suitable polyols are: pentaerythritol, dipentaerythritol, tripentaerythritol, bistrimethylolpropane, bistrimethylolethane, trismethylolpropane, sorbitol, maltitol, isomaltitol, lactitol, lycasin, mannitol, lactose, leucrose, tris(hydroxyethyl) isocyanurate, palatinitol, tetramethylolcyclohexanol, tetramethylolcyclopentanol, tetramethylolcyclopyranol, glycerol, diglycerol, polyglycerol and 1-0-α-D-glycopyranosyl-D-mannitol dihydrate. Preference is given to disaccharide alcohols.

The polyols can be used in an amount of, for example, from 0.01 to 20 parts by weight, preferably from 0.1 to 20 parts by weight, in particular from 0.1 to 10 parts by weight, based on 100 parts by weight of PVC.

Suitable organic phosphites are those of the general formula P(OR)$_3$, where the radicals R are identical or different alkyl, alkenyl, aryl or aralkyl radicals. Preferred organic phosphites are those of the formulae

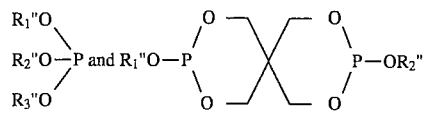

in which $R_1"$, $R_2"$ and $R_3"$ are identical or different and are $C_6$–$C_{18}$alkyl, $C_6$–$C_{18}$alkenyl, substituted or unsubstituted phenyl or $C_5$–$C_7$cycloalkyl.

$C_6$–$C_{18}$alkyl $R_1"$, $R_2"$ and $R_3"$ are, for example, n-hexyl, n-octyl, n-nonyl, decyl, dodecyl, tetradecyl, hexadecyl or octadecyl. Preference is given to alkyl groups having 8 to 18 carbon atoms.

Substituted phenyl $R_1"$, $R_2"$ and $R_3"$ are, for example, tolyl, ethylphenyl, xylyl, cumyl, cymyl, cresyl, 4-methoxyphenyl, 2,4-dimethoxyphenyl, ethoxyphenyl, butoxyphenyl, p-n-octylphenyl, p-n-nonylphenyl or p-n-dodecylphenyl.

Particularly suitable phosphites are trioctyl, tridecyl, tridodecyl, tritetradecyl, tristearyl, trioleyl, triphenyl, tricresyl, tris-p-nonylphenyl and tricyclohexyl phosphites, and particular preference is given to aryl dialkyl phosphites and alkyl diaryl phosphites, for example phenyl didecyl, 2,4-di-tert-butylphenyl didodecyl and 2,6-di-tert-butylphenyl didodecyl phosphites and dialkyl and diaryl pentaerythrityl diphosphites, such as distearyl pentaerythrityl diphosphite, and non-stoichiometric triaryl phosphites, for example of the composition $(H_{19}C_9$–$C_6H_4)O1.5P(OC_{12/13}H_{25/27})_{1.5}$.

Preferred organic phosphites are distearyl pentaerythrityl diphosphite, trisnonylphenyl phosphite and phenyl didecyl phosphite.

The organic phosphites can be used in an amount of, for example, from 0.01 to 10 parts by weight, preferably from 0.05 to 5 parts by weight, in particular from 0.1 to 3 parts by weight, based on 100 pans by weight of PVC.

Suitable compounds from the series consisting of the hydrotalcites or zeolites are both naturally occurring minerals and synthetic compounds. The additional use of hydrotalcites and/or zeolites in the novel compositions is preferred, since these compounds can synergistically increase the stabilization.

Compounds from the series consisting of the hydrotalcites can be described by the general formula I

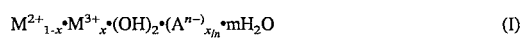

where $M^{2+}$=Mg, Ca, Sr, Zn, Sn and/or Ni, $M^{3+}$=Al, B or Bi, $A^n$ is an anion having the valency n, n is a number from 1 to 4, x is a number from 0 to 0.5, m is a number from 0 to 2, and $A^n$ is $OH^-$, $Cl^-$, $Br^-$, $I^-$, $ClO_4^-$, $HCO_3^-$, $CH_3COO^-$, $C_6H_5COO^-$, $CO_3^{2-}$, $SO_4^{2-}$, $$\begin{array}{c} COO^- \\ | \\ COO^-, \end{array}$$

$(CHOHCOO)_2^{2-}$, $(CHOH)_4CH_2OHCOO^-$, $C_2H_4(COO)_2^{2-}$, $(CH_2COO)_2^{2-}$, $CH_3CHOHCOO^-$, $SiO_3^{2-}$, $SiO_4^{4-}$, $Fe(CN)_6^{3-}$, $Fe(CN)_6^{4-}$ or $HPO_4^{2-}$; further examples are given in DE 41 06 403.

Other hydrotalcites which can preferably be used are compounds having the general formula Ia $$M_x^{2+}Al_2(OH)_{2x+6nz}(A^{n-})_2 \cdot mH_2O \qquad (Ia)$$

where $M^{2+}$ is at least one metal from the series consisting of Mg and Zn, preferably Mg, $A^{n-}$ is an anion, for example from the series consisting of $CO_3^{2-}$, $$\begin{pmatrix} COO \\ | \\ COO \end{pmatrix}^{2-},$$

$OH^-$ and $S^{2-}$, where n is the valency of the anion, m is a positive number, preferably from 0.5 to 5, and x and z are positive numbers, x preferably being from 2 to 6 and z preferably being less than 2.

Preference is given to compounds from the series consisting of the hydrotalcites of the general formula I $$M^{2+}_{1-x} \cdot M^{3+}_x \cdot (OH)_2 \cdot (A^{n-})_{x/n} \cdot mH_2O \qquad (I)$$

where $M^{2+}$ is Mg or a solid solution of Mg and Zn, $A^{n-}$ is $CO_3^{2-}$, x is a number from 0 to 0.5, and m is a number from 0 to 2.

Very particular preference is given to hydrotalcites of the formulae $Al_2O_3 \cdot 6MgO \cdot CO_2 \cdot 12H_2O$, $Mg_{4.5}Al_2(OH)_{13} \cdot CO_3 \cdot 3.5H_2O$, $4MgO \cdot Al_2O_3 \cdot CO_2 \cdot 9H_2O$, $4MgO \cdot Al_2O_3 \cdot CO_2 \cdot 6H_2O$, $ZnO \cdot 3MgO \cdot Al_2O_3 \cdot CO_2 \cdot 8-9H_2O$ or $ZnO \cdot 3MgO \cdot Al_2O_3 \cdot CO_2 \cdot 5-6H_2O$.

The hydrotalcites can be used in an amount of, for example, from 0.1 to 20 parts by weight, preferably from 0.1 to 10 parts by weight, in particular from 0.1 to 5 parts by weight, based on 100 pans by weight of PVC.

Zeolites can be described by the general formula (X)

$$M_{x/n}[(AlO_2)_x(SiO_2)_y] \cdot wH_2O \qquad (X)$$

where n is the charge of the cation M, M is an element from the first or second main group, or zinc, y:x is a number between 0.8 and infinity, preferably between 0.8 and 10.5, and w is a number between 0 and 300.

Furthermore, zeolites which can be used according to the invention are disclosed in "Atlas of Zeolite Structure Types", W. M. Meier and D. H. Olson, Butterworths, 3rd Edition, 1992.

Zeolites in a broader sense also include aluminium phosphates having a zeolite structure.

The preferred zeolites which are known per se have an average effective pore diameter of 3–5 Å and can be prepared by known methods. Particular preference is given to zeolites of type NaA which have an average effective pore diameter of 4 Å, and are therefore known as zeolites 4A.

Particular preference is given to crystalline sodium aluminosilicates whose particle size is at least predominantly in the range from 1–10 μm.

In a preferred embodiment of the invention, sodium aluminosilicates having rounded corners and edges can also be used. These zeolites are advantageously prepared from a batch whose molar composition is in the range 2.5–6.0 $Na_2O \cdot Al_2O_3 : 0.5$–$5.0$ $SiO_2 \cdot 60$–$200$ $H_2O$. This batch is crystallized in a conventional manner, advantageously by warming at 70–120° C., preferably 80–95° C., with stirring for at least ½ hour. The crystalline product is separated off in a simple manner, washed and then dried.

For the purposes of the present invention, finely divided, water-insoluble sodium aluminosilicates which have been precipitated and crystallized in the presence of water-soluble inorganic or organic dispersants can also be used. Suitable water-soluble organic dispersants are surfactants, non-surfactant aromatic sulfonic acids and compounds which are able to complex calcium. Said dispersants can be introduced into the reaction mixture in any desired manner before or during the precipitation; for example, they can be initially introduced as a solution or dissolved in the aluminate and/or silicate solution. The amount of dispersant should be at least 0.05 per cent by weight, preferably from 0.1–5 per cent by weight, based on the total precipitation batch. For the crystallization, the precipitation product is heated at from 50° to 200° C. for from ½ to 24 hours. From the multiplicity of dispersants which can be used, examples which may be mentioned are sodium lauryl ether sulfate, sodium polyacrylate and the sodium salt of 1-hydroxyethane-1,1-diphosphonic acid.

Preference is given to stabilized flexible PVC, as described above, containing at least one of the compounds of the formulae $Na_{12}Al_{12}Si_{12}O_{48} \cdot 27$ $H_2O$ [zeolite A], $Na_6Al_6Si_6O_{24} \cdot 2$ $NaX \cdot 7.5$ $H_2O$, $X=OH$, halogen, $ClO_4$ [sodalite]

$Na_6Al_6Si_{30}O_{72} \cdot 24$ $H_2O$, $Na_8Al_8Si_{40}O_{96} \cdot 24$ $H_2O$, $Na_{16}Al_{16}Si_{24}O_{80} \cdot 16$ $H_2O$, $Na_{16}Al_{16}Si_{32}O_{96} \cdot 16$ $H_2O$, $Na_{56}Al_{56}Si_{136}O_{384} \cdot 250$ $H_2O$, [zeolite Y]

$Na_{86}Al_{86}Si_{106}O_{384} \cdot 264$ $H_2O$ [zeolite X]

or the zeolites which can be prepared by replacement of all or some of the sodium atoms by lithium, potassium, magnesium, calcium, strontium or zinc atoms, such as $(Na,K)_{10}Al_{10}Si_{22}O_{64} \cdot 20$ $H_2O$.

$Ca_{4.5}Na_3[(AlO_2)_{12}(SiO_2)_{12}] \cdot 30$ $H_2O$ $K_9Na_3[(AlO_2)_{12}(SiO_2)_{12}] \cdot 27$ $H_2O$.

The zeolites can be used in an amount of, for example, from 0.1 to 20 parts by weight, preferably from 0.1 to 10 pans by weight, in particular from 0.1 to 5 pans by weight, based on 100 pans by weight of PVC.

Dawsonites can likewise be added to the PVC in the same amounts as the zeolites. These are aluminocarbonates of the formula $Na$(or $K$ or $Li$)$[Al(OH)_2CO_3] \cdot nH_2O$.

Preference is given to stabilized flexible PVC comprising 0.001–5.0 parts, per 100 parts of PVC, of a perchlorate or perchloric acid and, 0.1–50 parts, per 100 parts of PVC, of a terminal epoxide compound and, if desired, an antioxidant, in particular 0.01–10.0 parts per 100 parts of PVC.

Preference is furthermore given to stabilized flexible PVC wherein component (b) is an alkali metal perchlorate.

Preference is furthermore given to stabilized flexible PVC wherein component (c) is a terminal epoxide compound containing an aromatic group, in particular a bisphenol derivative.

Preference is furthermore given to stabilized flexible PVC additionally comprising substances selected from the group consisting of fillers and reinforcing materials, antioxidants, metal soaps and other metal-containing stabilizers, polyols, zeolites, hydrotalcites, dawsonites, organic phosphites, 1,3-diketo compounds, dihydropyridines, sterically hindered amines (HALS), light stabilizers, UV absorbers, lubricants, fatty acid esters, paraffins, blowing agents, optical brighteners, pigments, flameproofing agents, antistatics, β-aminocrotonates, pyrroles, naphthols, hydroxydiphenylamines, phenylindoles, phosphates, thiophosphates, gelling aids, peroxide-destroying compounds, modifiers and other complexing agents for Lewis acids.

Preference is furthermore given to stabilized flexible PVC comprising (b) 0.001–3.0 parts, per 100 parts of PVC, of a perchlorate and (c) 0.1–5.0 parts, per 100 parts of PVC, of a terminal epoxy resin.

Preference is furthermore given to stabilized flexible PVC additionally comprising a phenolic antioxidant.

Preference is furthermore given to stabilized flexible PVC additionally comprising fillers, in particular chalk.

Preference is furthermore given to stabilized flexible PVC additionally comprising one or more metal soaps, in particular zinc soaps.

Preference is furthermore given to stabilized flexible PVC additionally comprising at least one additive from the group consisting of disaccharide alcohols, organic phosphites, zeolites, hydrotalcites, dawsonites, aminocrotonates, polyols, diketones, pyrroles, β-naphthol and dihydropyridines.

Preference is furthermore given to stabilized flexible PVC additionally comprising at least one additive from the group consisting of organic phosphites, zeolites, dawsonites and hydrotalcites.

Preference is furthermore given to stabilized flexible PVC additionally comprising a sterically hindered amine, in particular 0.01–5 parts, per 100 parts of PVC.

The present invention furthermore relates to the use of a perchlorate or perchloric acid in combination with a terminal epoxide compound for stabilizing PVC. The above preferences apply to the individual stabilizers and to the PVC itself, and one of the further constituents described above can likewise additionally be used.

The flexible PVC stabilized according to the invention can be prepared in a manner known per se, to which end said stabilizers and, if desired, further additives are mixed with the PVC using equipment known per se, such as calenders, mixers, compounders, extruders and the like. During this operation, the stabilizers can be added individually or as a mixture or alternatively in the form of masterbatches. The invention thus also relates to a process for the preparation of stabilized flexible PVC, which comprises mixing components (b) and (c) of claim 1 and, if desired, further additives with the PVC using equipment such as calenders, mixers, compounders, extruders or the like.

The flexible PVC stabilized in accordance with the present invention can be converted into the desired shape in a known manner. Methods of this type are, for example, grinding, calendering, extrusion, injection moulding, sintering or spinning, furthermore extrusion blow moulding or conversion by the plastisol process. The stabilized flexible PVC can also be converted into foams.

The flexible PVC according to the invention is particularly suitable for flexible formulations, in particular in the form of flexible formulations for foams and moulded articles like wire sheaths, cable insulations, decoration sheeting, agricultural sheeting, tubes, sealing profiles and office films.

The examples below illustrate the invention in greater detail without representing a limitation. Parts and percentages are, as in the remainder of the description, by weight, unless stated otherwise.

EXAMPLES

A flexible PVC composition is prepared by mixing the individual components as shown in the tables below (amounts in parts by weight).

The constituents are homogenized for 5 minutes in mixing rolls at 170° C. giving a film with a thickness of 0.3–0.5 mm.

The long-term stability is determined by a static heat test ("stat.h.") in accordance with DIN 53381, in which the sample is stored in a test oven at 190° C. and the time taken for the sample to blacken is determined.

A further determination of the long-term stability ("VDE test") is carried out by determining the thermal stability in accordance with DIN VDE 0472. In this test, the sample is warmed in a glass tube sealed at the bottom (AR glass from Peco-Laborbedarf GmbH, Darmstadt) in an oil bath at 200° C., and the time taken for a visible red coloration (corresponding to a pH of 3) to appear on the universal indicator paper is determined.

A further determination of the stability of the PVC is carded out by the dehydrochlorination test ("DHC test"), carried out in accordance with DIN 53381, sheet 3. In this test, the time taken for the dehydrochlorination curve to rise is measured at the temperature shown in each case.

Long-term oven storage test:

Pressed PVC sheets measuring 10×10×2 mm are produced and then stored in an oven at from 100±0.5° C. for a defined time (3,7 or 14 days). The samples are then subjected to the dehydrochlorination test described above.

Long-term milling test.

The PVC mixture is milled at a temperature of 180° C. in a mill with a nip width of 0.5 mm, and a sample is taken every 5 minutes and cooled, and its yellowness index (YI) is measured.

TABLE I

| | Dehydrochlorination test at 200° C. | | | |
|---|---|---|---|---|
| Mixture | 1 | 2 | 3 | 4 |
| PVC, K value 70 | 100 | 100 | 100 | 100 |
| DIDP[1]) plasticizer | 49 | 49 | 49 | 49 |
| NaClO$_4$ | — | 0.05 | — | 0.05 |
| Epoxidized soybean oil | 3.0 | 3.0 | — | — |
| Araldit GY 250[2]) | — | — | 3.0 | 3.0 |
| Minutes | 26.5 | 26.0 | 33.5 | 38.0 |

[1])Diisododecyl phthalate,
[2])Bisphenol A diglycidyl ether (Araldit ® GY 250)

It is found that the stabilization by means of epoxide and perchlorate (mixture 4) is far superior to that by means of epoxidized soybean oil and perchlorate.

TABLE II

| | Static heat test at 190° C. | | |
|---|---|---|---|
| Mixture | 16 | 17 | 18 |
| PVC, K value 70 | 100 | 100 | 100 |
| DIDP[1]) plasticizer | 49 | 49 | 49 |
| NaClO$_4$ | 0.05 | 0.05 | 0.05 |
| Araldit GY 250[2]) | 3.0 | | |
| Araldit GT 1180[11]) | | 3.0 | |
| Araldit PY 306[12]) | | | 3.0 |
| Minutes | 50.0 | 50.0 | 55.5 |

[1])Diisododecyl phthalate,
[2])Bisphenol A diglycidyl ether (Araldit ® GY 250)
[11])Acetone containing epoxy-phenol novolak,
[12])Low-viscosity bisphenol F glycidyl ether The good stabilization by means of various epoxides is apparent.

TABLE III

VDE test at 200° C.

| Mixture | 6 | 7 | 8 |
|---|---|---|---|
| PVC, K value 70 | 100 | 100 | 100 |
| DIDP[1] plasticizer | 49 | 49 | 49 |
| Chalk | 50 | 50 | 50 |
| NaClO$_4$ | 0.05 | 0.05 | 0.05 |
| Araldit GY 250[2] | 5 | 5 | 5 |
| Zinc stearate | 0.6 | 0.6 | 0.6 |
| Maltitol | 0.5 | 0.5 | 0.5 |
| Bisphenol A | 0.5 | 0.5 | 0.5 |
| β-Diketone[4] | 0.3 | 0.3 | 0.3 |
| Wessalith P[6] | — | 1.0 | — |
| Alkamizer IV[5] | — | — | 1.0 |
| Minutes | 135 | 195 | 164 |

[1] Diisododecyl phthalate,
[2] Bisphenol A diglycidyl ether (Araldit ® GY 250)
[4] Stearoylbenzoylmethane, dibenzoylmethane,
[5] Hydrotalcite from Kyowa,
[6] 4A zeolite from Degussa The advantage on addition of zeolites or hydrotalcites is apparent here.

TABLE IV

VDE test at 200° C.

| Mixture | 9 | 10 | 11 | 12 |
|---|---|---|---|---|
| PVC K-value 70 | 100 | 100 | 100 | 100 |
| DIDP[1] plasticizer | 49 | 49 | 49 | 49 |
| Chalk | 50 | 50 | 50 | 50 |
| NaClO$_4$ | 0.05 | 0.05 | 0.05 | 0.05 |
| Araldit GY 282[3] | 5 | 5 | 5 | 5 |
| Zinc stearate | 0.6 | 0.6 | 0.6 | 0.6 |
| Maltitol | 0.5 | 0.5 | 0.5 | 0.5 |
| Bisphenol A | 0.5 | 0.5 | 0.5 | 0.5 |
| β-Diketone | 0.3 | 0.3 | 0.3 | 0.3 |
| Wessalith P[6] | 1.00 | | | |
| m-OH-DPA[8] | | 0.3 | | |
| Pyrrole | | | 0.3 | |
| β-Naphthol | | | | 0.3 |
| Minutes | 202 | 206 | 200 | 205 |

[1] Diisododecyl phthalate,
[3] Bisphenol F diglycidyl ether (Araldit ® GY 282)
[8] m-Hydroxydiphenylamine The positive effect of organic costabilizers is apparent here.

TABLE V

Dehydrochlorination test at 200° C.

| Mixture | 13 | 14 | 15 |
|---|---|---|---|
| PVC, K value 70 | 100 | 100 | 100 |
| DIDP[1] plasticizer | 50 | 50 | 50 |
| NaClO$_4$ | 0.05 | 0.05 | 0.05 |
| Araldit GY 250[2] | 3 | 3 | 3 |
| Bisphenol A | 0.5 | | |
| Irganox 1076[7] | | 0.5 | |
| Irganox 1010[8] | | | 0.5 |
| Minutes | 43 | 51 | 52 |

[1] Diisododecyl phthalate,
[2] Bisphenol A diglycidyl ether (Araldit ® GY 250)
[3] Bisphenol F diglycidyl ether (Araldit ® GY 282)
[7] Octadecyl 3-(3,5-di-tert-butyl-4-hydroxyphenyl)propionate
[8] Pentaerythrityl tetrakis[3-(3,5-di-tert-butyl-4-hydroxyphenyl)propionate The advantage on additional use of a phenolic antioxidant is apparent.

TABLE VI

Dehydrochlorination test at 200° C.

| Mixture | 16 | 17 | 18 | 19 | 20 |
|---|---|---|---|---|---|
| PVC, K value 70 | 100 | 100 | 100 | 100 | 100 |
| DIDP[1]-plasticizer | 47 | 47 | 47 | 47 | 47 |
| LOXIOL G71 S[10] | 0.5 | 0.5 | 0.5 | 0.5 | 0.5 |
| NaClO$_4$ | 0.07 | 0.07 | 0.07 | 0.07 | 0.07 |
| Zinc stearate | 0.05 | 0.05 | 0.05 | 0.05 | 0.05 |
| Rhodiastab 50[9] | 0.2 | 0.2 | 0.2 | 0.2 | 0.2 |
| Bisphenol A | | | | 0.3 | 0.3 |
| Epoxidized soybean oil | 3.0 | | | | |
| Araldit GY 250[2] | | 3.0 | | 3.0 | |
| Araldit PT 810[15] | | | 3.0 | | 3.0 |
| Minutes | 15 | 32.5 | 41 | 51.5 | 46.5 |

[1] Diisododecyl phthalate
[2] Bisphenol A diglycidyl ether (Araldit ® GY 250)
[9] Stearoylbenzoylmethane
[10] Polyethylene wax
[15] Solid heterocyclic epoxy resin (triglycidyl isocyanurate)

a) The positive effect of bisphenol A and b) the superiority of the novel mixture over the corresponding mixture containing epoxidized soybean oil are apparent here.

TABLE VII

Long-term milling test

| Mixture | 16 | 17 | 18 |
|---|---|---|---|
| PVC, K value 70 | 100 | 100 | 100 |
| DIDP[1]-plasticizer | 47 | 47 | 47 |
| LOXIOL G71 S[10] | 0.5 | 0.5 | 0.5 |
| NaClO$_4$ | 0.07 | 0.07 | 0.07 |
| Zn-Stearat | 0.05 | 0.05 | 0.05 |
| Rhodiastab 50[9] | 0.2 | 0.2 | 0.2 |
| Bisphenol A | | | |
| Epoxidized soybean oil | 3.0 | | |
| Araldit GY 250[2] | | 3.0 | |
| Araldit PT 810[15] | | | 3.0 |
| YI after 5 Minutes | 22 | 6 | 7 |
| YI after 10 Minutes | 59 | 8 | 9 |
| YI after 15 Minutes | 102 | 11 | 11 |

[1] Diisododecyl phthalate
[2] Bisphenol A diglycidyl ether (Araldit ® GY 250)
[9] Stearoylbenzoylmethane
[10] Polyethylene wax
[15] Solid heterocyclic epoxy resin (triglycidyl isocyanurate)

In this test too, mixtures 16 and 17 are superior to those containing epoxidized soybean oil.

What is claimed is:

1. A composition comprising
   (a) flexible polyvinyl chloride (PVC),
   (b) perchloric acid or a perchlorate and
   (c) a terminal epoxide compound.

2. A composition according to claim 1, wherein component (b) is an alkali metal perchlorate.

3. A composition according to claim 1, wherein component (c) is a terminal epoxide compound containing an aromatic group.

4. A composition according to claim 1, additionally comprising substances selected from the group consisting of fillers and reinforcing materials, antioxidants, polyols, zeolites, hydrotalcites, dawsonites, organic phosphites, 1,3-diketo compounds, dihydropyridines, sterically hindered amines (HALS), light stabilizers, ultraviolet light (UV) absorbers, lubricants, fatty acid esters, paraffins, lubricants, optical brighteners, pigments, flameproofing agents, antistatics, β-aminocrotonates, pyrroles, β-naphthols, hydroxydiphenylamines, phenylindoles, phosphates, thiophosphates, gelling aids, peroxide-destroying compounds, modifiers and other complexing agents for Lewis acids.

5. A composition according to claim 1, comprising (a) flexible PVC, (b) 0.001–3.0 parts, per 100 parts of PVC, of a perchlorate and (c) 0.1–5.0 parts, per 100 parts PVC, of a terminal epoxy resin.

6. A composition according to claim 1, additionally comprising a phenolic antioxidant.

7. A composition according to claim 1, additionally comprising fillers.

8. A composition according to claim 7, additionally comprising one or more metal soaps.

9. A method for stabilizing flexible PVC by means of a perchlorate or perchloric acid in combination with a terminal epoxide compound.

10. A process for the preparation of stabilized flexible PVC, which comprises mixing components (b) and (c) according to claim 1 and, if desired, further additives with the PVC using calenders, mixers, compounders, or extruders.

11. A method of producing foams and moulded articles wherein flexible PVC stabilized according to claim 10 is employed.

12. A method of producing wire sheaths, cable insulation, decoration sheeting, foams, agricultural sheeting, tubes, sealing profiles or office films wherein flexible PVC stabilized according to claim 10 is employed.

13. A composition according to claim 3, wherein component (c) is a bisphenol compound.

14. A composition according to claim 7, wherein the filler is chalk.

15. A composition according to claim 1, further comprising one of the following ingredients: a disaccharide alcohol, organic phosphite, zeolite, hydrotalcite, dawsonite, aminocrotonate, polyol, diketone, pyrrole, β-naphthol or dihydropyridine, or a mixture thereof.

16. A composition according to claim 1, further comprising one of the following ingredients: an organic phosphite, zeolite, dawsonite or hydrotalcite, or a mixture thereof.

* * * * *